UNITED STATES PATENT OFFICE.

WILLIAM FREDRICK REMUS, OF RANGATAUA, AND ALEXANDER EDMUND MACREDIE AND CHARLES FREDERICK CORK, OF AUCKLAND, NEW ZEALAND.

PROCESS FOR THE PRODUCTION OF MEAT POWDER.

1,382,673.     Specification of Letters Patent.     Patented June 28, 1921.

No Drawing.     Application filed September 10, 1919. Serial No. 322,996.

*To all whom it may concern:*

Be it known that we, WILLIAM FREDRICK REMUS, ALEXANDER EDMUND MACREDIE, and CHARLES FREDERICK CORK, subjects of the King of Great Britain, residing at Rangataua, Auckland, New Zealand, and Auckland, New Zealand, respectively, have invented a new and useful Improved Process for the Production of Meat Powder; and we do hereby declare the following to be a full, clear, and exact description of the same.

This invention relates to an improved process that has been devised for the production of meat powder from beef, mutton and the like, in a form suitable for packing and storage. These powders are then useful for the preparation of the foods such as jellies, soups, etc., for which the ordinary meat extracts are used.

The present process consists in the submission of the meat to an initial slow drying operation, followed by a smoking or preserving treatment, and finally a grinding or powdering operation.

In carrying out the process the carcass to be treated is hung until it sets and all animal heat is evaporated. It is then boned and all superfluous fat removed, after which the meat is cut up into blocks of suitable size. For the best practical results, the blocks of meat should be about a thickness of three inches in diameter and of any desired lengths.

These blocks are then laid across shelf gratings or trays with grating bottoms and placed within a suitably constructed drying room in which a temperature of about 135° Fah. is maintained. The meat is subjected to the action of this heat for a period of not less than thirty-six hours nor more than forty hours, during which time the room is kept dry by carrying off by suitable mechanical agencies all steam or moist heat and moisture given off from the meat. Any sweating or cooking of the meat is thereby prevented.

When this drying process is completed, the shelves or trays, with the meat thereon, are transferred to a smoke chamber constructed to receive them. In this room a circulation of good clean smoke is maintained by convenient means, such smoke being finally led to an outlet through which it is carried off so as to also carry with it any moisture contents of the room. The meat is subjected to the action of the smoke for a period of eight hours.

After this period has elasped the meat is removed and it is then in a state or condition ready for breaking up or grinding into powder. The operation for thus breaking and grinding it may be performed by any convenient forms of known grinding mills and sieve it to the required degree of fineness.

The powder thus produced may then, after it has thoroughly cooled, and preferably not before the expiration of a period of four hours, be packed into suitable containers for marketing, and sealed.

The constructions of the rooms or chambers for use in the drying and smoking of the meat may be varied and adapted to suit different circumstances and therefore they form no features of the present invention. Care must be taken however, that in their construction, full provision is made for the uniform circulation of the heating and smoking agencies throughout the whole area, so as to treat all the contents equally, and also for the ready escape of all moisture.

In the powdering of the dried meat it is preferred to carry out the operation in two stages, by the first of which the meat is broken up by a mill of suitable design and sieved through a very fine sieve, and the residue incapable of passing through the sieve, then ground in a grinding mill to the necessary degree of fineness, to pass through the sieve.

In all cases the times of treatment and the temperature of the drying operation may be varied to suit special requirements and the nature of the meat being operated on.

We claim:

A process for the production of meat powder consisting in the subjection of raw cold meat in blocks to the drying action of a chamber in which a temperature of approximately 135° Fah. is maintained for a period of from 36 to 40 hours, subsequently subjecting such meat to a smoking action for a period of about eight hours and finally pulverizing the resultant product, substantially as specified.

In testimony whereof, we have signed this specification in the presence of two subscribing witnesses.

WILLIAM FREDRICK REMUS.
ALEXANDER EDMUND MACREDIE.
CHARLES FREDERICK CORK.

Witnesses:
W. E. Hughes,
S. Oldfield.